(12) United States Patent
Tyan et al.

(10) Patent No.: US 11,867,939 B2
(45) Date of Patent: Jan. 9, 2024

(54) COMPOSITE OPTICAL FILM

(71) Applicant: UBRIGHT OPTRONICS CORPORATION, Taoyuan (TW)

(72) Inventors: Yi-Long Tyan, Taoyuan (TW); Ching-An Yang, Taoyuan (TW); Pin-Han Wang, Taoyuan (TW); Lung-Pin Hsin, Taoyuan (TW); Hui-Yong Chen, Taoyuan (TW)

(73) Assignee: UBRIGHT OPTRONICS CORPORATION, Taoyuan (TW)

( * ) Notice: Subject to any disclaimer, the term of this patent is extended or adjusted under 35 U.S.C. 154(b) by 42 days.

(21) Appl. No.: 17/859,020

(22) Filed: Jul. 7, 2022

(65) Prior Publication Data

US 2023/0008063 A1 Jan. 12, 2023

Related U.S. Application Data

(60) Provisional application No. 63/218,929, filed on Jul. 7, 2021.

(51) Int. Cl.
*F21V 8/00* (2006.01)

(52) U.S. Cl.
CPC ......... *G02B 6/0036* (2013.01); *G02B 6/0051* (2013.01)

(58) Field of Classification Search
CPC ............................ G02B 6/0036; G02B 6/0051
See application file for complete search history.

(56) References Cited

U.S. PATENT DOCUMENTS

| | | | |
|---|---|---|---|
| 2009/0091937 A1* | 4/2009 | Chiang | G02B 5/045 362/330 |
| 2010/0085735 A1* | 4/2010 | Kim | G02B 5/045 359/599 |
| 2010/0103350 A1* | 4/2010 | Arai | G02B 6/0053 349/64 |
| 2010/0165603 A1* | 7/2010 | Sun | G02B 6/0053 362/97.2 |
| 2011/0025956 A1* | 2/2011 | Usukura | G02B 5/0215 349/95 |
| 2015/0029729 A1* | 1/2015 | Liu | G02B 3/005 362/317 |
| 2017/0090241 A1* | 3/2017 | Eo | G02B 6/0053 |
| 2020/0233145 A1* | 7/2020 | Yagi | G02B 6/0036 |

* cited by examiner

*Primary Examiner* — Christopher E Dunay
(74) *Attorney, Agent, or Firm* — Min-Lee Teng

(57) ABSTRACT

A composite optical film comprises: a first substrate; a plurality of reversed prisms disposed on a bottom surface of the first substrate; and a first diffusion film disposed over a top surface of the first substrate.

18 Claims, 10 Drawing Sheets

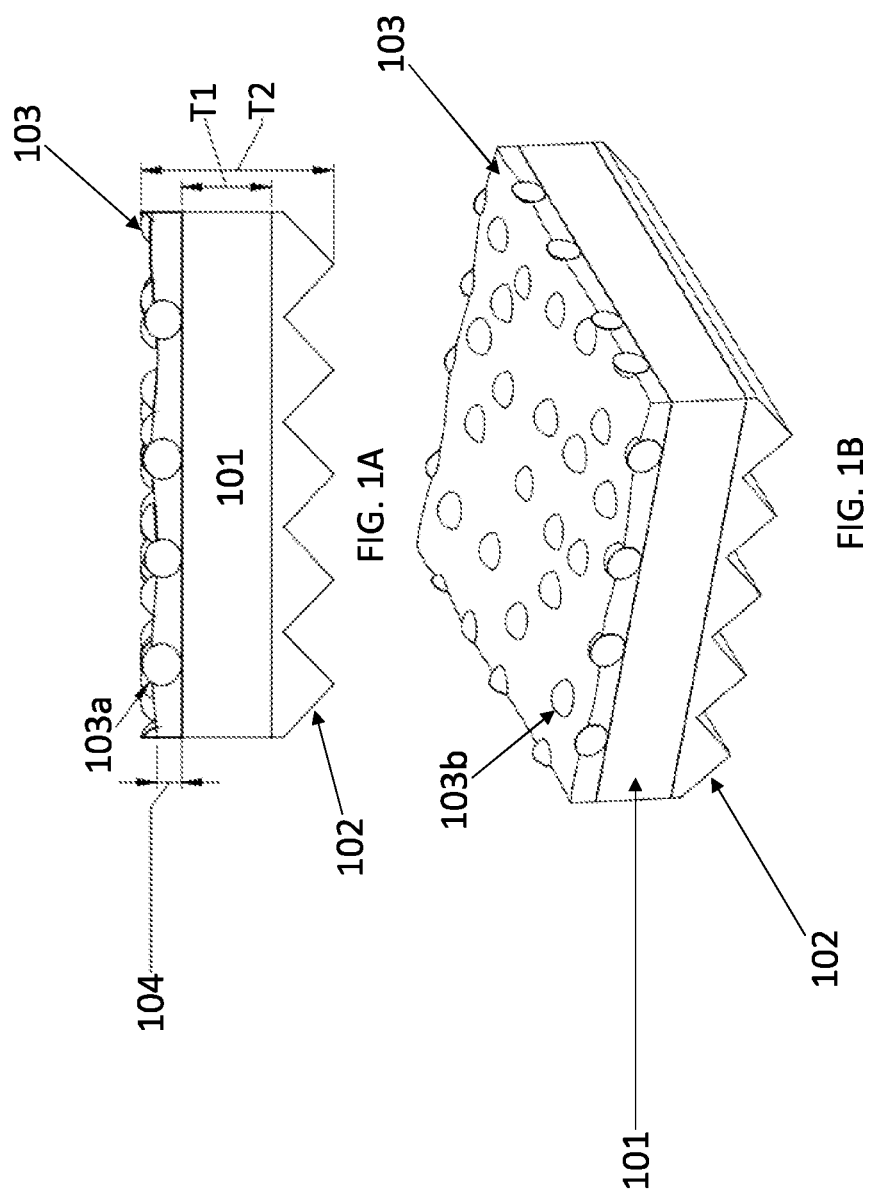

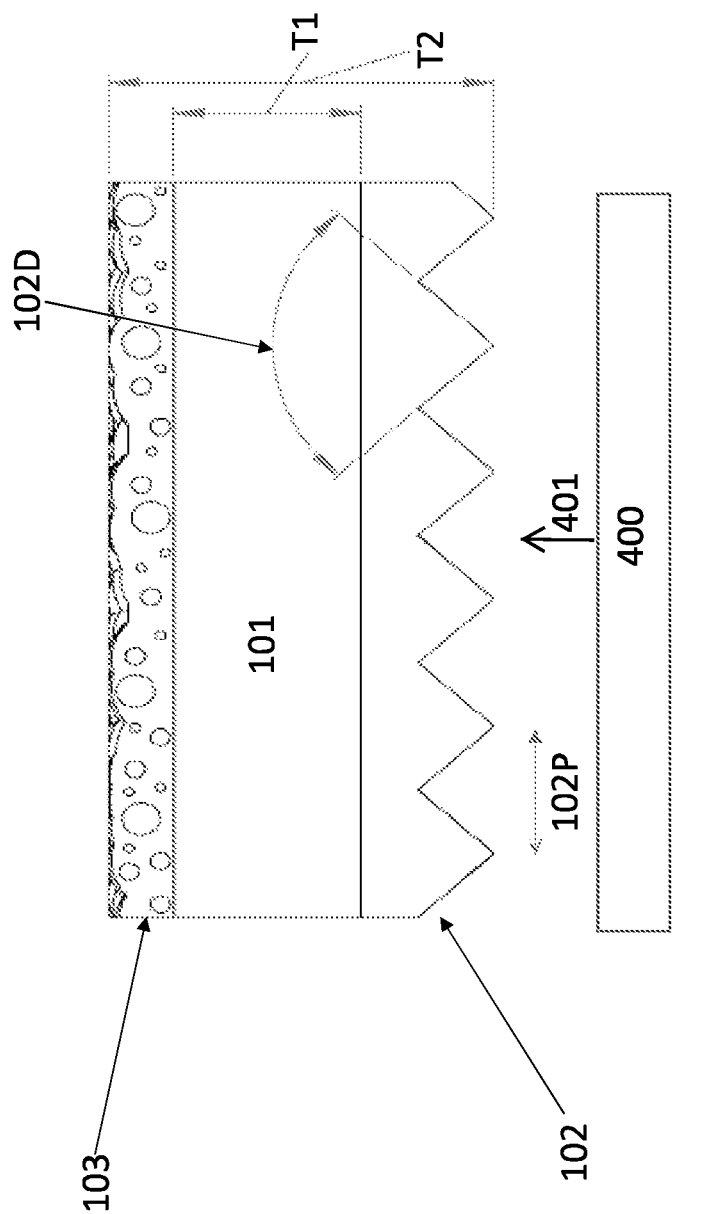

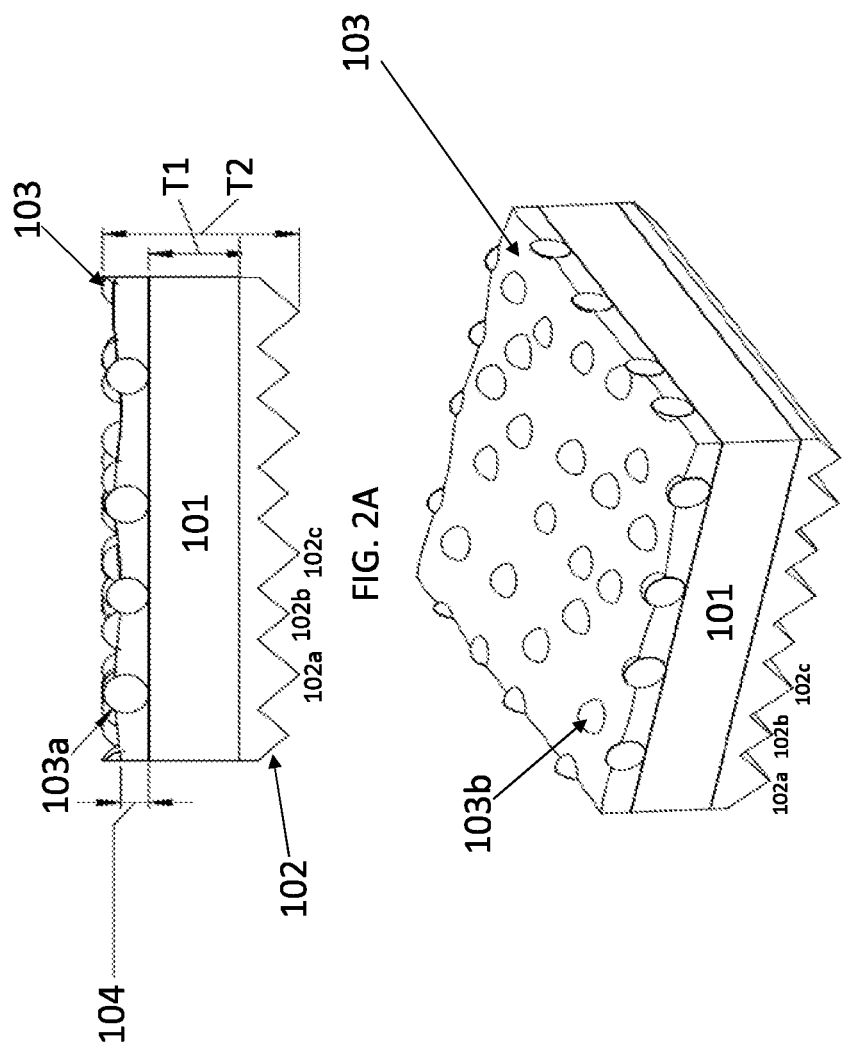

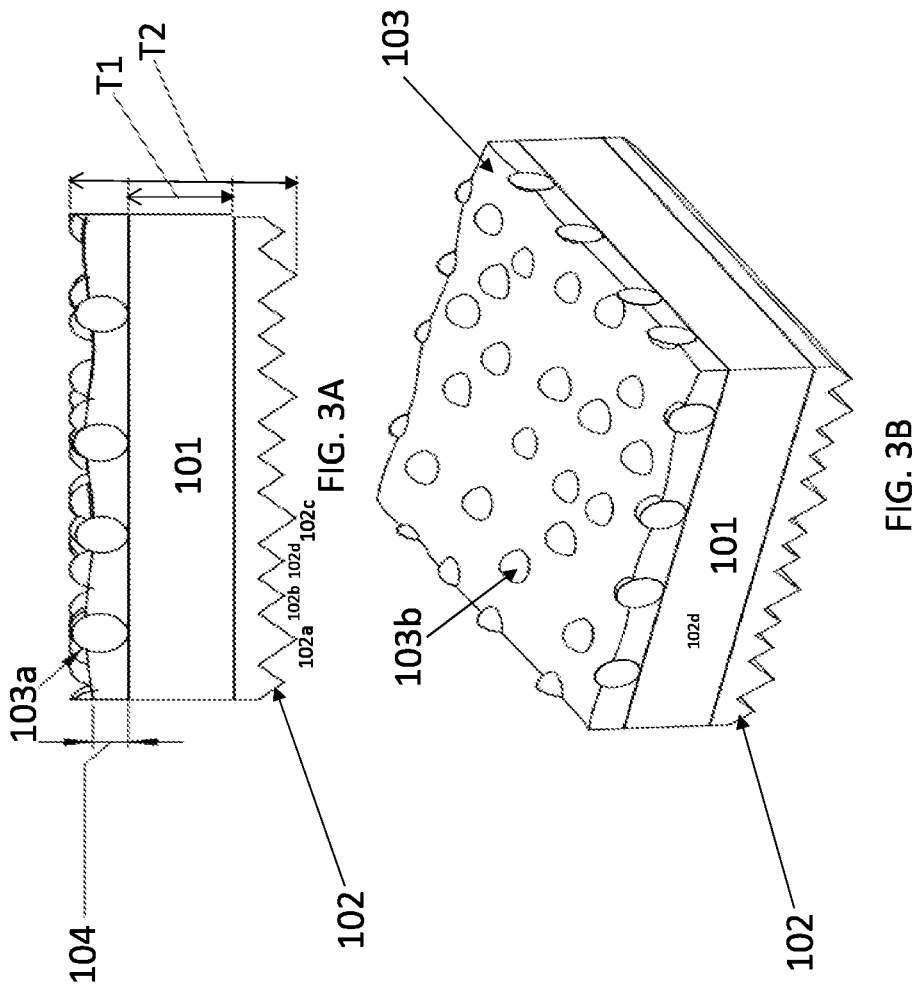

| Reversed Prisms | one high/one low reversed prisms | one high/two low reversed prisms | Equal height reversed prisms |
|---|---|---|---|
| Light guide plate | Light guide plate | Light guide plate | Light guide plate |
| Photos of testing result | | | |
| Testing result | NO adsorption | NO adsorption | Adsorption Phenomenon |

FIG. 3C

COMPOSITE OPTICAL FILM

CROSS-REFERENCE TO RELATED APPLICATIONS

This application claims the benefit of U.S. provisional patent application No. 63/218,929, filed on Jul. 7, 2021, which is hereby incorporated herein by reference.

BACKGROUND OF THE INVENTION

1. Field of the Invention

The present invention relates to an optical film, and more particularly to a composite optical film used for directing light from a Light Guide Plate.

2. Description of Related Art

A Light Guide Plate is used to guide the direction of light, the principle of the light guide plate is to use total reflection to transmit the light of the light source to the far end of the light guide plate, and a diffusing layer will be used to guide the light to the front of the light guide plate. However, some light will be transmitted from the front of the light guide plate, and the remaining light that cannot be diffused will be re-introduced into the light guide plate by the reflector at the bottom, which will decrease the brightness and the uniformity of the emitting light from the Light Guide Plate.

Accordingly, the present invention proposes a new solution to overcome the above-mentioned disadvantages.

SUMMARY OF THE INVENTION

Due to the isotropic light focusing properties produced by the reversed prisms, the reversed prisms can direct the light emitted from the light guide plate in a direction perpendicular to the light guide plate. By combining the reversed prisms with a diffusion layer as a composite optical film, the composite optical film can increase the brightness and the uniformity of the emitting light from the Light Guide Plate.

In one embodiment, the present invention discloses a composite optical film, wherein the composite optical film comprises: a first substrate; a plurality of reversed prisms, disposed on a bottom surface of the first substrate; and a first diffusion film, disposed over a top surface of the first substrate.

In one embodiment, the first substrate is a PET film, wherein the plurality of reversed prisms are formed on the PET film.

In one embodiment, the plurality of reversed prisms comprises a plurality of first-type reversed prisms and a plurality of second-type reversed prisms, wherein a first peak point of the first-type prism is located lower than a second peak point of the second-type prism, wherein the plurality of first-type reversed prisms and the plurality of second-type reversed prisms are interleaved along an edge of the bottom surface of the first substrate.

In one embodiment, the plurality of reversed prisms comprises a plurality of first-type reversed prisms and a plurality of second-type reversed prisms, wherein a first peak point of the first-type prism is located lower than a second peak point of the second-type prism, wherein for each two adjacent first-type reversed prisms, there are two of the second-type reversed prisms located between said two adjacent first-type reversed prisms.

In one embodiment, an adhesive layer is disposed on the top surface of the first substrate, and the first diffusion film is disposed on the adhesive layer.

In one embodiment, a plurality of first prisms are disposed over the first diffusion film, wherein the plurality of first prisms are disposed on a top surface of a second substrate, and the second substrate is disposed on a top surface of the first diffusion film.

In one embodiment, a plurality of second prisms are disposed over the plurality of first prisms, wherein the plurality of second prisms are disposed on a top surface of a third substrate, and the third substrate is disposed on a top surface of the plurality of first prisms.

In one embodiment, a resin layer is disposed on a bottom surface of the third substrate.

In one embodiment, a resin layer is disposed on a bottom surface of the second substrate.

In one embodiment, a resin layer is disposed on a bottom surface of the second substrate, and a resin layer is disposed on a bottom surface of the third substrate.

In one embodiment, the resin layer is a clear hard coat (clear HC) resin layer; with the high surface-hardness and low refractive index of the clear hard coat (clear HC) resin layer, the scratch resistance of the PET substrate surface and the overall brightness can be improved by 32% compared with the conventional structure.

The clear hard coat (clear HC) resin layer can be formed by using a precise continuous roll-to-roll wet-coating method.

In one embodiment, the clear HC resin layer has a low refractive index.

In one embodiment, the plurality of first prisms are extended along a first direction, and the plurality of second prisms are extended along a second direction that is perpendicular to the first direction.

In one embodiment, the first substrate comprises at least one of the following: PET (polyethylene terephthalate), PEN (polyethylene naphtholate), PAR (polyacrylate), PC (polycarbonates), or TAC (cellulose triacetate).

In one embodiment, the second substrate comprises at least one of the following: PET (polyethylene terephthalate), PEN (polyethylene naphtholate), PAR (polyacrylate), PC (polycarbonates), or TAC (cellulose triacetate).

In one embodiment, the third substrate comprises at least one of the following: PET (polyethylene terephthalate), PEN (polyethylene naphtholate), PAR (polyacrylate), PC (polycarbonates), or TAC (cellulose triacetate).

In one embodiment, a plurality of first microstructures are formed on a top surface of each of the plurality of first prisms.

In one embodiment, a plurality of second microstructures are formed on a top surface of each of the plurality of second prisms.

In one embodiment, each of the plurality of first microstructures has a convex shape.

In one embodiment, each of the plurality of second microstructure has a convex shape.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein:

FIG. 1A illustrates a schematic side view of a composite optical film according to one embodiment of the present invention;

FIG. 1B illustrates a schematic top view of the composite optical film according to one embodiment of the present invention;

FIG. 1C illustrates a schematic top view of the composite optical film being used with a light guide plate according to one embodiment of the present invention;

FIG. 2A illustrates a schematic side view of a composite optical film according to one embodiment of the present invention;

FIG. 2B illustrates a schematic top view of the composite optical film according to one embodiment of the present invention;

FIG. 3A illustrates a schematic side view of a composite optical film according to one embodiment of the present invention;

FIG. 3B illustrates a schematic top view of the composite optical film according to one embodiment of the present invention;

FIG. 3C shows testing results for adsorption phenomenon with different types of reversed prisms;

DETAILED DESCRIPTION OF THE ILLUSTRATED EMBODIMENTS

Figure 4:
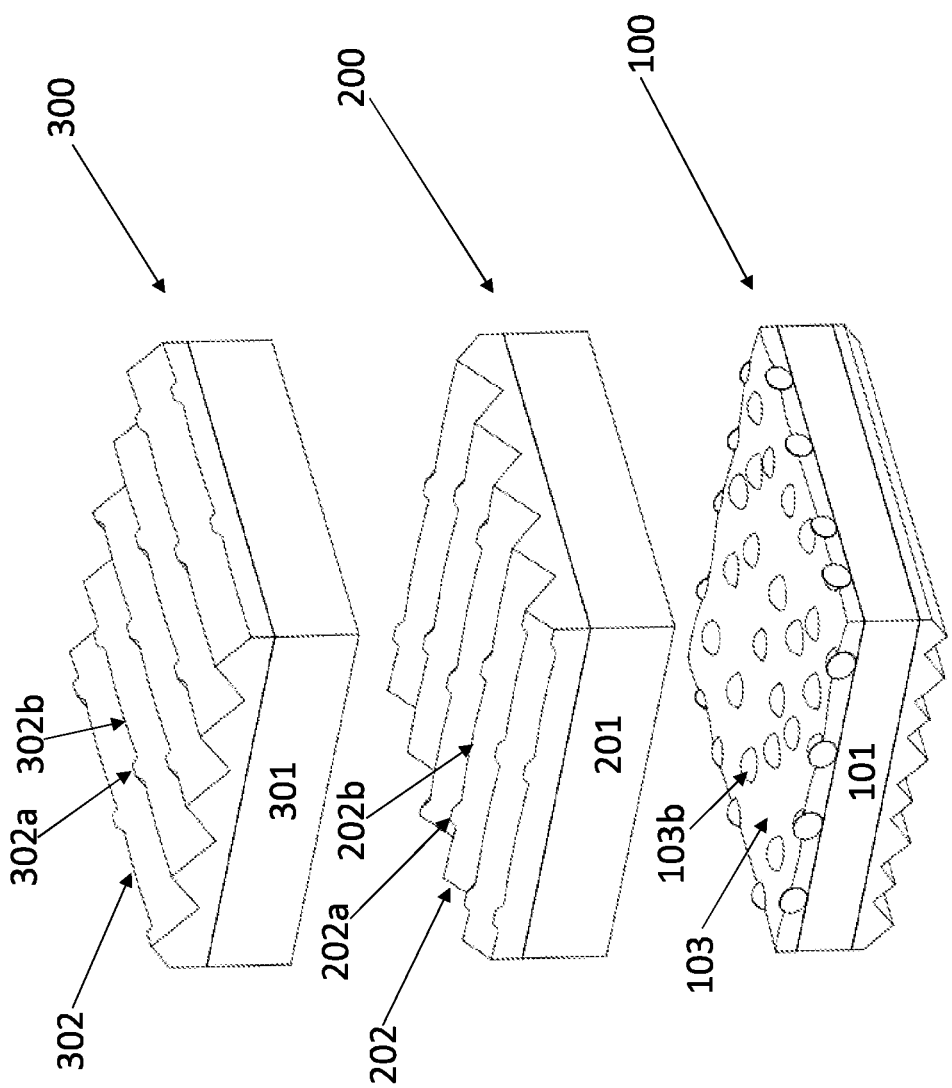
FIG. 4 illustrates a schematic top view of the composite optical film according to one embodiment of the present invention.

The detailed explanation of the present invention is described as follows. The described preferred embodiments are presented for purposes of illustrations and descriptions, and they are not intended to limit the scope of the present invention.

FIG. 1A illustrates a schematic side view of a composite optical film 100 according to one embodiment of the present invention. FIG. 1B illustrates a schematic top view of the composite optical film 100 according to one embodiment of the present invention. As shown in FIG. 1A and FIG. 1B, wherein a composite optical film 100 comprises: a first substrate 101; a plurality of reversed prisms 102, disposed on a bottom surface of the first substrate 101; and a first diffusion film 103, disposed over a top surface of the first substrate 101. As shown in FIG. 1C, a light guide plate 400 is disposed under the reversed prisms 102. Due to the isotropic light focusing properties produced by the reversed prisms 102, the reversed prisms 102 can direct a light 401 emitted from the light guide plate 400 in a direction perpendicular to the light guide plate 400.

In one embodiment, as shown in FIG. 1A, an adhesive layer 104 is disposed on the top surface of the first substrate 101, and the first diffusion film 103 is disposed on the adhesive layer 104.

In one embodiment, as shown in FIG. 1A, a plurality of beads are coated on a top surface of the first substrate to form the diffusing layer 103, wherein a haze of the diffusing layer 103 is in a range of 10~40%.

In one embodiment, as shown in FIG. 1B, the first diffusion film 103 comprises a plurality of first microstructures 103b on the top surface of the first diffusion film 103.

In one embodiment, as shown in FIG. 1A, the thickness T1 of the first substrate 101 is in a range of 10-300 um.

In one embodiment, as shown in FIG. 1A, the first substrate 101 is made of PET.

In one embodiment, as shown in FIG. 1A, the thickness T2 of the composite optical film 100 is in a range of 20-350 um.

In one embodiment, as shown in FIG. 1B, each of the plurality of first microstructures 103b has a convex shape.

In one embodiment, as shown in FIG. 1C, the prism angle 102D of the reversed prism is 65-90 degrees.

In one embodiment, as shown in FIG. 1C, the prism angle 102D of the reversed prism is 80-90 degrees.

In one embodiment, as shown in FIG. 1C, the pitch 102P between two adjacent reversed prisms of the reversed prism is 23-25 um.

In one embodiment, as shown in FIG. 1C, the thickness of the reversed prisms is 70-90 um.

In one embodiment, as shown in FIG. 2A and FIG. 2B, the plurality of reversed prisms 102 comprises a plurality of first-type reversed prisms 102a, 102c and a plurality of second-type reversed prisms 102b, 102d, wherein a first peak point of each the first-type prism 102a, 102c is located lower than a second peak point of each the second-type prism 102b, 102d, wherein the plurality of first-type reversed prisms 102a, 102c and the plurality of second-type reversed prisms 102b, 102d are interleaved along an edge of the bottom surface.

In one embodiment, as shown in FIG. 2A, the plurality of reversed prisms 102 comprising a plurality of first-type reversed prisms 102a, 102c and a plurality of second-type reversed prisms 102b, 102d with unequal heights can avoid the adsorption problem between the high-density structure of the composite optical film 100 and a light guide plate disposed under the composite optical film 100.

In one embodiment, as shown in FIG. 2A, an adhesive layer 104 is disposed on the top surface of the first substrate 101, and the first diffusion film 103 is disposed on the adhesive layer 104.

In one embodiment, as shown in FIG. 2A, a plurality of beads are coated on a top surface of the first substrate to form the diffusing layer 103, wherein a haze of the diffusing layer 103 is in a range of 10~40%.

In one embodiment, as shown in FIG. 2B, the first diffusion film 103 comprises a plurality of first microstructures 103b on the top surface of the first diffusion film 103.

In one embodiment, as shown in FIG. 2B, each of the plurality of first microstructures 103b has a convex shape.

In one embodiment, as shown in FIG. 3A and FIG. 3B, the plurality of reversed prisms 102 comprises a plurality of first-type reversed prisms 102a, 102c and a plurality of second-type reversed prisms 102b, 102d, wherein a first peak point of each the first-type prism 102a, 102c is located lower than a second peak point of each the second-type prism 102b, 102d, wherein for each two adjacent first-type reversed prisms 102a, 102c, there are two of the second-type reversed prisms 102b, 102d located between said two adjacent first-type reversed prisms.

In one embodiment, as shown in FIG. 3A, the plurality of reversed prisms 102 comprising a plurality of first-type reversed prisms 102a, 102c and a plurality of second-type reversed prisms 102b, 102d with unequal heights can avoid the adsorption problem between the high-density structure of the composite optical film 100 and a light guide plate disposed under the composite optical film 100.

In one embodiment, as shown in FIG. 3A, an adhesive layer 104 is disposed on the top surface of the first substrate 101, and the first diffusion film 103 is disposed on the adhesive layer 104.

In one embodiment, as shown in FIG. 3A, a plurality of beads are coated on a top surface of the first substrate to form the diffusing layer 103, wherein a haze of the diffusing layer 103 is in a range of 10~40%.

In one embodiment, as shown in FIG. 3B, the first diffusion film 103 comprises a plurality of first microstructures 103b on the top surface of the first diffusion film 103.

In one embodiment, as shown in FIG. 3B, each of the plurality of first microstructures 103b has a convex shape.

In one embodiment, as shown in FIG. 3A, an adhesive layer is disposed on the top surface of the first substrate, and the first diffusion film is disposed on the adhesive layer.

In one embodiment, as shown in FIG. 4, a plurality of first prisms 202 are disposed over the first diffusion film 103, wherein the plurality of first prisms 202 are disposed on a top surface of a second substrate 201, and the second substrate 201 is disposed on a top surface of the first diffusion film 103.

In one embodiment, as shown in FIG. 4, a plurality of second prisms 302 are disposed over the plurality of first prisms 202, wherein the plurality of second prisms are disposed on a top surface of a third substrate, and the third substrate is disposed on a top surface of the plurality of first prisms.

FIG. 3C shows testing results for the adsorption phenomenon with different types of reversed prisms, As shown in FIG. 3C, the reversed prisms with one high reversed prism and one low reversed prism, as shown in FIG. 2A, has no adsorption phenomenon between the reversed prisms and the light guide plate; the reversed prisms with one high reversed prism and two low reversed prisms between the reversed prisms and the light guide plate, as shown in FIG. 3A, has no adsorption phenomenon. However, the reversed prism with equal height will have an adsorption phenomenon between the reversed prisms and the light guide plate, as shown in the photos in FIG. 3C.

In one embodiment, as shown in FIG. 4, the plurality of first prisms are extended along a first direction, and the plurality of second prisms are extended along a second direction that is perpendicular to the first direction.

In one embodiment, as shown in FIG. 4, a plurality of first microstructure 202a are formed on the top surface of each of the plurality of first prisms 202.

In one embodiment, as shown in FIG. 4, a plurality of second microstructures 302a are formed on the top surface of each of the plurality of second prisms 302.

In one embodiment, as shown in FIG. 4, wherein each of the plurality of first microstructures 202a has a convex shape.

In one embodiment, as shown in FIG. 4, each of the plurality of second microstructures 103b has a convex shape.

In one embodiment, as shown in FIG. 4, a plurality of first elevating portions 202a and a plurality of first non-elevating portions 202b are formed on the top surface of each of the plurality of first prisms 202.

In one embodiment, as shown in FIG. 4, a plurality of second elevating portions 302a and a plurality of second non-elevating portions 302b are formed on the top surface of each of the plurality of second prisms 302.

In one embodiment, each of the plurality of first elevating portions 202a has a flat top surface.

In one embodiment, each of the plurality of second elevating portions 302a has a flat top surface.

As shown in FIG. 4, a triple-diaphragm structure 100, 200, 300 of the high-brightness composite optical film of the present invention includes an optical film 100 with reversed prisms 102 with a diffusion film 103, a lower film 200 with prisms 202, and an upper film 300 with prisms 302, the overall brightness and thickness of the triple-diaphragm structure 100, 200, 300 of the present invention will be better than that of the conventional triple-diaphragm structure. In addition, the triple-diaphragm structure 100, 200, 300 of the present invention has higher brightness, higher coverage, and higher light leveling properties at the same time.

Figure 5:
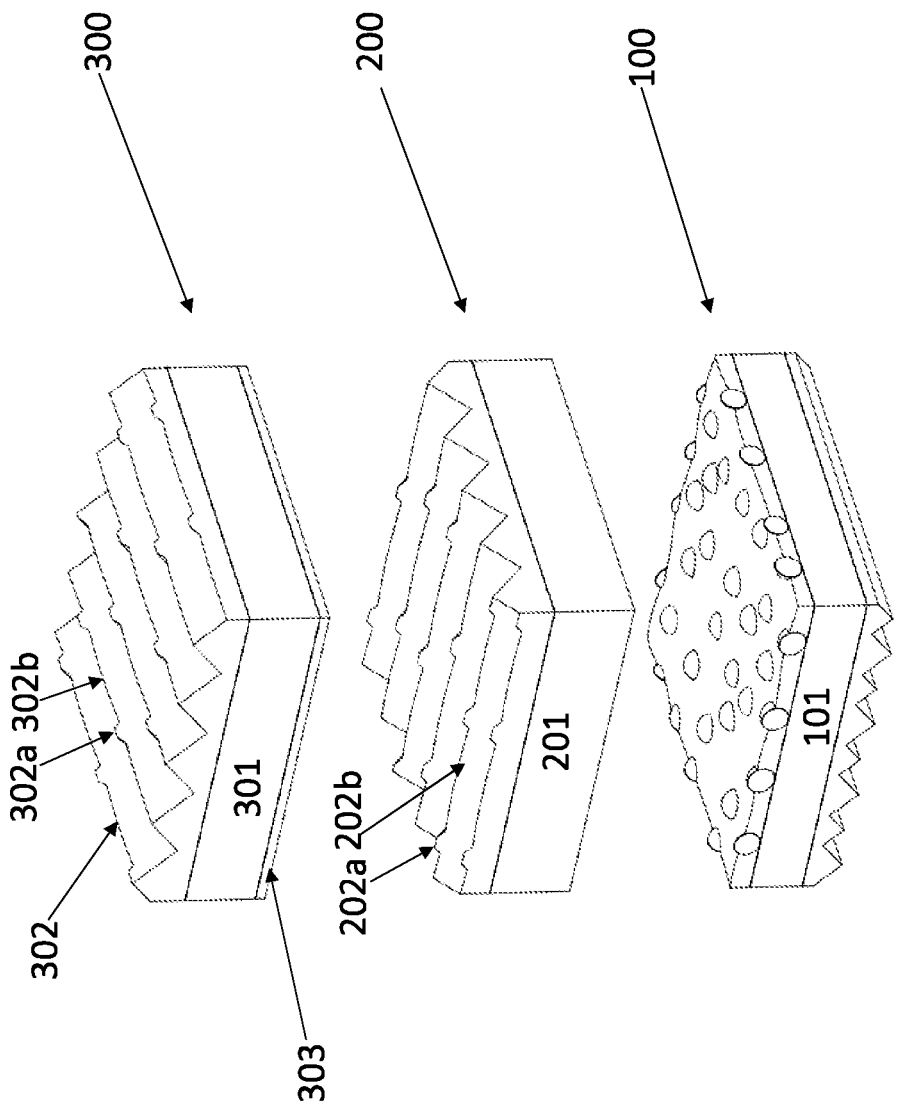
FIG. 5 illustrates a schematic top view of the composite optical film according to one embodiment of the present invention.

In one embodiment, as shown in FIG. 5, a resin layer 303 is disposed on a bottom surface of the third substrate 301.

In one embodiment, the resin layer 303 is a clear hard coat (clear HC) resin layer; with the high surface hardness and low refractive index of the clear hard coat (clear HC) resin layer, the scratch resistance of the PET substrate surface and the overall brightness can be improved.

The clear hard coat (clear HC) resin layer can be formed by using the precise continuous roll-to-roll wet coating method.

In one embodiment, as shown in FIG. 5, the plurality of first prisms are extended along a first direction, and the plurality of second prisms are extended along a second direction that is perpendicular to the first direction.

In one embodiment, as shown in FIG. 5, a plurality of first microstructures are formed on a top surface of each of the plurality of first prisms.

In one embodiment, as shown in FIG. 5, a plurality of second microstructures are formed on a top surface of each of the plurality of second prisms.

In one embodiment, as shown in FIG. 5, wherein each of the plurality of first microstructures has a convex shape.

In one embodiment, as shown in FIG. 5, each of the plurality of second microstructures has a convex shape.

In one embodiment, as shown in FIG. 5, a plurality of elevating portions 202a and a plurality of non-elevating portions 202b are formed on the top surface of each of the plurality of first prisms 202.

In one embodiment, as shown in FIG. 5, a plurality of elevating portions 302a and a plurality of non-elevating portions 302b are formed on the top surface of each of the plurality of second prisms 302.

As shown in FIG. 5, a triple-diaphragm structure 100, 200, 300 of the high-brightness composite optical film of the present invention includes an optical film 100 with reversed prisms 102 with a diffusion film 103, a lower film 200 with prisms 202, and an upper film 300 with prisms 302, the overall brightness and thickness of the triple-diaphragm structure 100, 200, 300 of the present invention will be better than that of the conventional triple-diaphragm structure. In addition, the triple-diaphragm structure 100, 200, 300 of the present invention has higher brightness, higher coverage, and higher light leveling properties at the same time.

Figure 6:
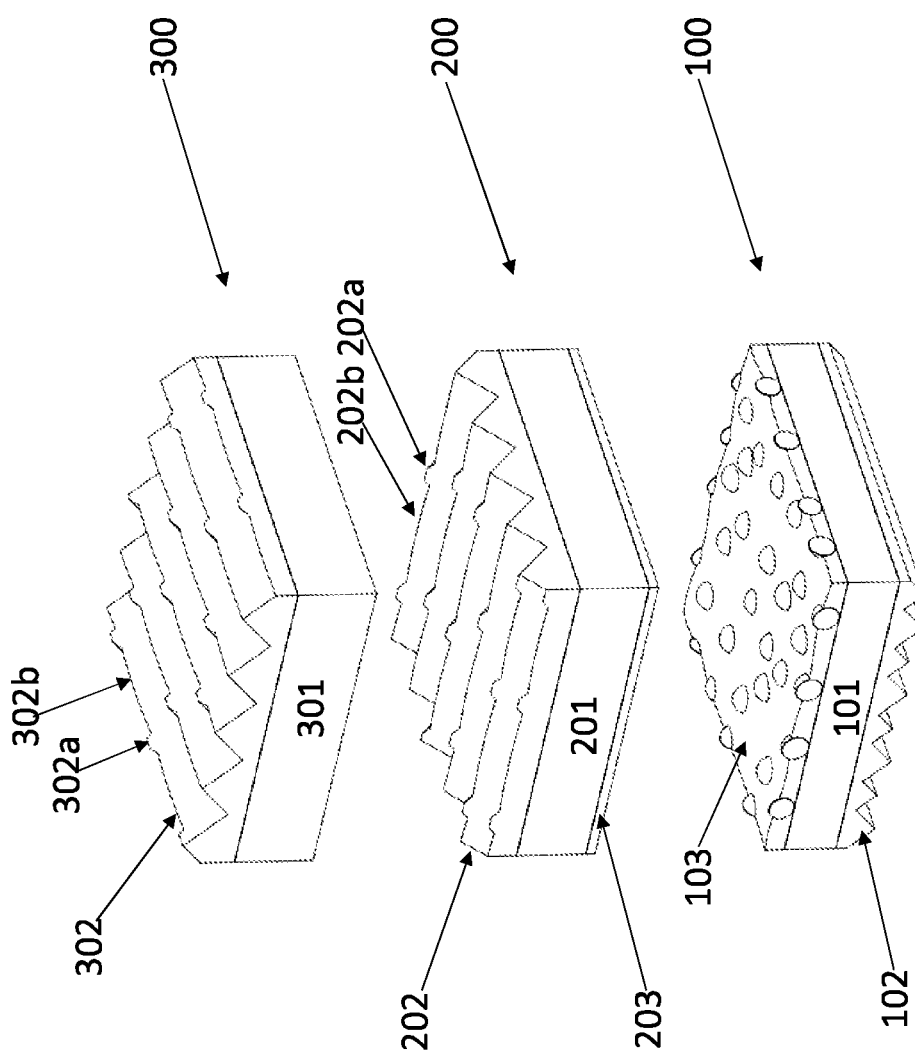
FIG. 6 illustrates a schematic top view of the composite optical film according to one embodiment of the present invention.

In one embodiment, as shown in FIG. 6, wherein a resin layer 203 is disposed on a bottom surface of the second substrate 201.

In one embodiment, resin layer 203 is a clear hard coat (clear HC) resin layer; with the high surface hardness and low refractive index of the clear hard coat (clear HC) resin layer, the scratch resistance of the PET substrate surface and the overall brightness can be improved.

The clear hard coat (clear HC) resin layer can be formed by using the precise continuous roll-to-roll wet coating method.

In one embodiment, as shown in FIG. 6, the plurality of first prisms are extended along a first direction, and the plurality of second prisms are extended along a second direction that is perpendicular to the first direction.

In one embodiment, as shown in FIG. 6, a plurality of first microstructures are formed on a top surface of each of the plurality of first prisms.

In one embodiment, as shown in FIG. 6, a plurality of second microstructures are formed on a top surface of each of the plurality of second prisms.

In one embodiment, as shown in FIG. 6, wherein each of the plurality of the first microstructure has a convex shape.

In one embodiment, as shown in FIG. 6, each of the plurality of second microstructures has a convex shape.

In one embodiment, as shown in FIG. 6, a plurality of elevating portions 202a and a plurality of non-elevating portions 202b are formed on the top surface of each of the plurality of first prisms 202.

In one embodiment, as shown in FIG. 6, a plurality of elevating portions 302a and a plurality of non-elevating portions 302b are formed on the top surface of each of the plurality of second prisms 302.

As shown in FIG. 6, a triple-diaphragm structure 100, 200, 300 of the high-brightness composite optical film of the present invention includes an optical film 100 with reversed prisms 102 with a diffusion film 103, a lower film 200 with prisms 202, and an upper film 300 with prisms 302, the overall brightness and thickness of the triple-diaphragm structure 100, 200, 300 of the present invention will be better than that of the conventional triple-diaphragm structure. In addition, the triple-diaphragm structure 100, 200, 300 of the present invention has higher brightness, higher coverage, and higher light leveling properties at the same time.

Figure 7:
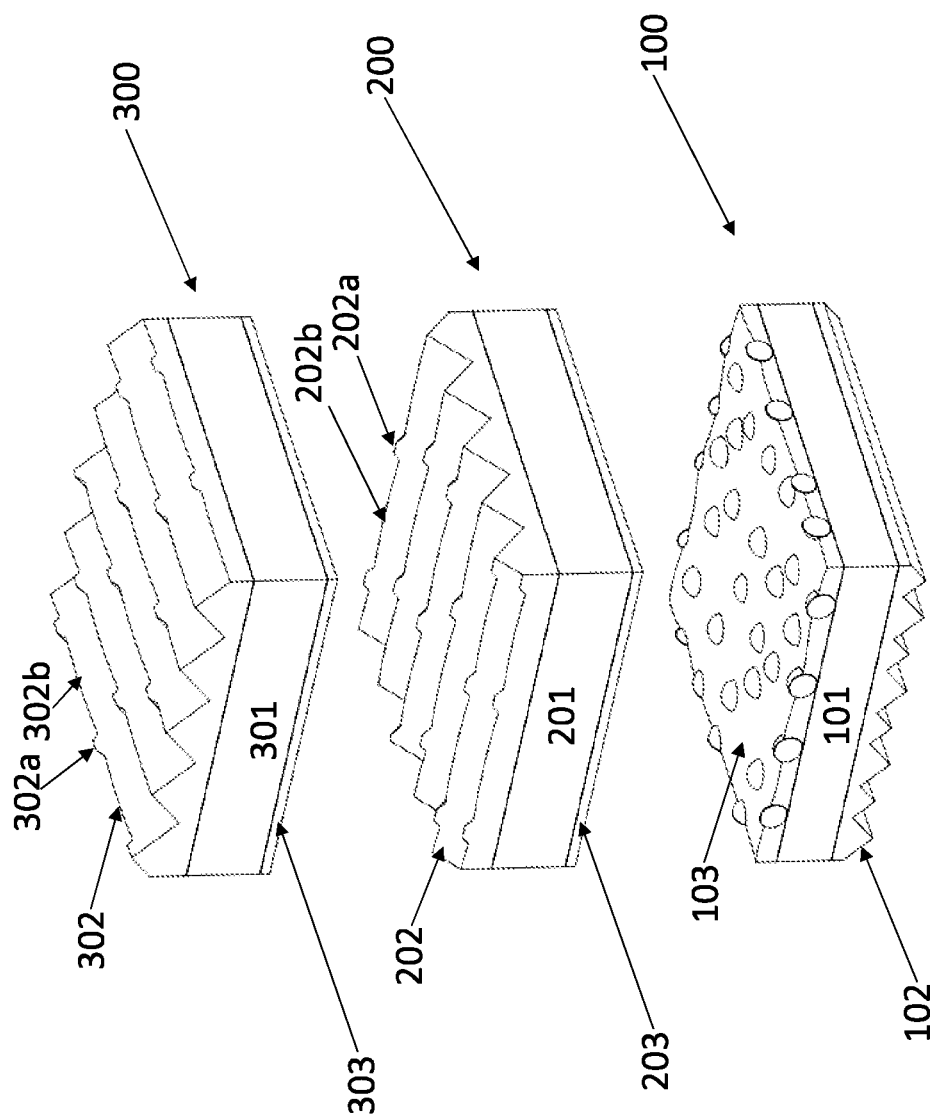
FIG. 7 illustrates a schematic top view of the composite optical film according to one embodiment of the present invention.

In one embodiment, as shown in FIG. 7, a resin layer 203 is disposed on a bottom surface of the second substrate 201, and a resin layer 303 is disposed on a bottom surface of the third substrate 301.

In one embodiment, each of the resin layer 203 and the resin layer 303 is a clear hard coat (clear HC) resin layer; with the high surface hardness and low refractive index of clear hard coat (clear HC) resin layer, the scratch resistance of the PET substrate surface and the overall brightness can be improved by 32%.

The clear hard coat (clear HC) resin layer can be formed by using the precise continuous roll-to-roll wet coating method.

In one embodiment, as shown in 7, the plurality of first prisms are extended along a first direction, and the plurality of second prisms are extended along a second direction that is perpendicular to the first direction.

In one embodiment, as shown in FIG. 7, a plurality of first microstructures are formed on a top surface of each of the plurality of first prisms.

In one embodiment, as shown in FIG. 7, a plurality of second microstructures are formed on a top surface of each of the plurality of second prisms.

In one embodiment, as shown in FIG. 7, wherein each of the plurality of first microstructures has a convex shape.

In one embodiment, as shown in FIG. 7, each of the plurality of second microstructures has a convex shape.

In one embodiment, as shown in FIG. 7, a plurality of elevating portions 202a and a plurality of non-elevating portions 202b are formed on the top surface of each of the plurality of first prisms 202.

In one embodiment, as shown in FIG. 7, a plurality of elevating portions 302a and a plurality of non-elevating portions 302b are formed on the top surface of each of the plurality of second prisms 302.

As shown in FIG. 7, a triple-diaphragm structure 100, 200, 300 of the high-brightness composite optical film of the present invention includes an optical film 100 with reversed prisms 102 with a diffusion film 103, a lower film 200 with prisms 202, and an upper film 300 with prisms 302, the overall brightness and thickness of the triple-diaphragm structure 100, 200, 300 of the present invention will be better than that of the conventional triple-diaphragm structure. In addition, the triple-diaphragm structure 100, 200, 300 of the present invention has higher brightness, higher coverage, and higher light leveling properties at the same time.

In one embodiment, the first substrate comprises at least one of the following: PET (polyethylene terephthalate), PEN (polyethylene naphtholate), PAR (polyacrylate), PC (polycarbonates), or TAC (cellulose triacetate).

In one embodiment, the second substrate comprises at least one of the following: PET (polyethylene terephthalate), PEN (polyethylene naphtholate), PAR (polyacrylate), PC (polycarbonates), or TAC (cellulose triacetate).

In one embodiment, the third substrate comprises at least one of the following: PET (polyethylene terephthalate), PEN (polyethylene naphtholate), PAR (polyacrylate), PC (polycarbonates), or TAC (cellulose triacetate).

Figure 8:
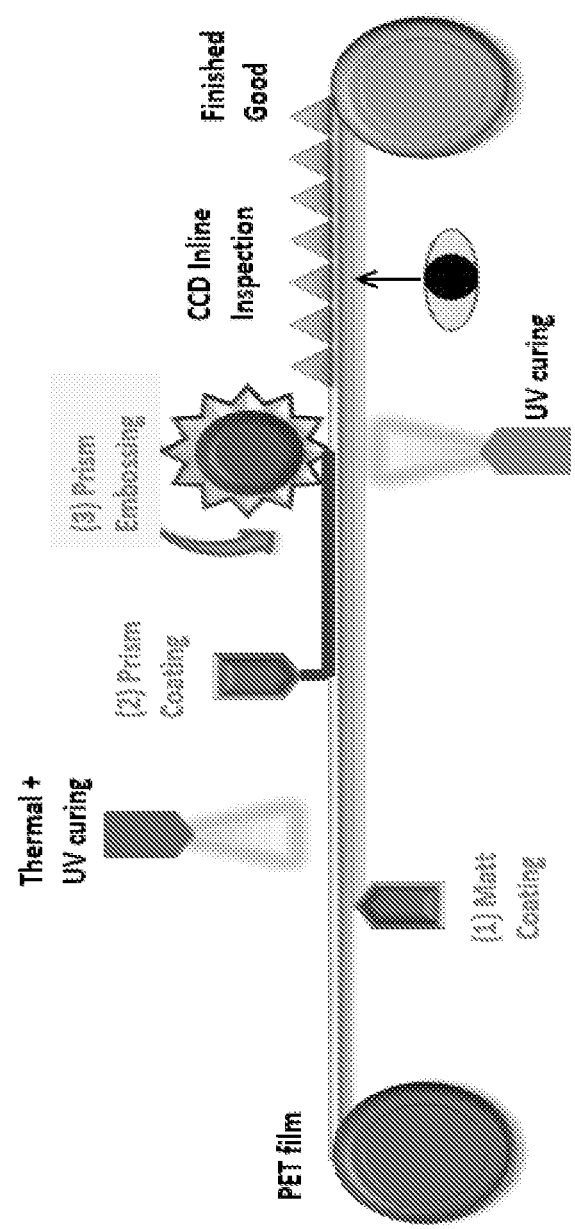
FIG. 8 illustrates a method for forming a composite optical film according to one embodiment of the present invention.

FIG. 8 illustrates a method for forming a composite optical film according to one embodiment of the present invention, wherein the method comprises: stretching out a PET film; forming a diffusing layer on the bottom side of the PET film; and forming a plurality of reserved prisms on the top side of the PET film.

In one embodiment, the light-incident surface of the above PET film is coated with UV acrylic adhesive material, and then the plurality of reserved prisms are formed by forming the patterns corresponding to the reserved prisms using a roller.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A composite optical film, said composite optical film comprising:
   a first substrate;
   a plurality of reversed prisms, disposed on a bottom surface of the first substrate; and
   a first diffusion film, disposed over a top surface of the first substrate;
   a plurality of first prisms, disposed over the first diffusion film, wherein the plurality of first prisms are disposed on a top surface of a second substrate, and the second substrate is disposed on a top surface of the first diffusion film; and a plurality of second prisms, disposed over the plurality of first prisms, wherein the plurality of second prisms are disposed on a top surface of a third substrate, and the third substrate is disposed on a top surface of the plurality of first prisms, wherein the plurality of first prisms include a plurality of first elevating portions and a plurality of first non-elevating portions, and wherein the plurality of second prisms include a plurality of second elevating portions and a plurality of second non-elevating portions.

2. The composite optical film according to claim 1, wherein the plurality of reversed prisms comprises a plurality of first-type reversed prisms and a plurality of second-type reversed prisms, wherein a first peak point of a first-type reversed prism is located lower than a second peak point of a second-type reversed prism, wherein the plurality of first-type reversed prisms and the plurality of second-type reversed prisms are interleaved along an edge of the bottom surface of the first substrate.

3. The composite optical film according to claim 1, wherein the plurality of reversed prisms comprises a plurality of first-type reversed prisms and a plurality of second-type reversed prisms, wherein a first peak point of a first-type reversed prism is located lower than a second peak point of a second-type reversed prism, wherein for each two adjacent first-type reversed prisms, there are two of the second-type reversed prisms located between said two adjacent first-type reversed prisms.

4. The composite optical film according to claim 1, wherein an adhesive layer is disposed on the top surface of the first substrate, and the first diffusion film is disposed on the adhesive layer.

5. The composite optical film according to claim 1, wherein a clear HC resin layer is disposed on a bottom surface of the third substrate.

6. The composite optical film according to claim 1, wherein a clear HC resin layer is disposed on a bottom surface of the second substrate.

7. The composite optical film according to claim 1, wherein a first clear hard coat resin layer is disposed on a bottom surface of the second substrate, and a second clear hard coat resin layer is disposed on a bottom surface of the third substrate.

8. The composite optical film according to claim 1, wherein the plurality of first prisms are extended along a first direction, and the plurality of second prisms are extended along a second direction that is perpendicular to the first direction.

9. The composite optical film according to claim 1, wherein a plurality of beads are coated on a top surface of the first substrate to form the first diffusing layer, wherein a haze of the first diffusing layer is in a range of 10~40%.

10. The composite optical film according to claim 1, wherein the second substrate and the plurality of first prisms are integrated formed.

11. The composite optical film according to claim 1, wherein each of the second substrate and the third substrate is a PET film.

12. The composite optical film according to claim 1, wherein each of the plurality of first elevating portions has a flat top surface.

13. The composite optical film according to claim 12, wherein a prism angle of the reversed prism is 65-90 degrees.

14. A composite optical film being used with a light guide plate, said composite optical film comprising:

a first substrate;

a plurality of reversed prisms, disposed on a bottom surface of the first substrate, said light guide plate being located under the plurality of reversed prisms, wherein the plurality of reversed prisms comprises a plurality of first-type reversed prisms and a plurality of second-type reversed prisms, wherein a first peak point of a first-type reversed prism is located lower than a second peak point of a reversed second-type prism; and a first diffusion film, disposed over a top surface of the first substrate;

a plurality of first prisms, disposed over the first diffusion film, wherein the plurality of first prisms are disposed on a top surface of a second substrate, and the second substrate is disposed on a top surface of the first diffusion film; and a plurality of second prisms, disposed over the plurality of first prisms, wherein the plurality of second prisms are disposed on a top surface of a third substrate, and the third substrate is disposed on a top surface of the plurality of first prisms, wherein the plurality of first prisms include a plurality of first elevating portions and a plurality of first non-elevating portions, and wherein the plurality of second prisms include a plurality of second elevating portions and a plurality of second non-elevating portions.

15. The composite optical film according to claim 14, wherein the plurality of first-type reversed prisms and the plurality of second-type reversed prisms are interleaved along an edge of the bottom surface of the first substrate.

16. The composite optical film according to claim 14, wherein for each two adjacent first-type reversed prisms, there are two of the second-type reversed prisms located between said two adjacent first-type reversed prisms.

17. A composite optical film being used with a light guide plate, said composite optical film comprising:

a first substrate;

a plurality of reversed prisms, disposed on a bottom surface of the first substrate, said light guide plate being located under the plurality of reversed prisms; and a first diffusion film, disposed over a top surface of the first substrate;

a plurality of first prisms, disposed over the first diffusion film, wherein the plurality of first prisms are disposed on a top surface of a second substrate, and the second substrate is disposed on a top surface of the first diffusion film; and a plurality of second prisms, disposed over the plurality of first prisms, wherein the plurality of second prisms are disposed on a top surface of a third substrate, and the third substrate is disposed on a top surface of the plurality of first prisms, wherein the plurality of first prisms include a plurality of first elevating portions and a plurality of first non-elevating portions, and wherein the plurality of second prisms include a plurality of second elevating portions and a plurality of second non-elevating portions.

18. The composite optical film according to claim 17, wherein a clear HC resin layer is disposed on a bottom surface of the second substrate or a bottom surface of the third substrate.

* * * * *